United States Patent [19]
Cornuejols

[11] Patent Number: 5,638,119
[45] Date of Patent: Jun. 10, 1997

[54] DEVICE FOR INCREASING THE DYNAMIC RANGE OF A CAMERA

[75] Inventor: Georges Cornuejols, Montpellier, France

[73] Assignee: Scanera S.C., Paris, France

[21] Appl. No.: 920,302

[22] PCT Filed: Feb. 18, 1991

[86] PCT No.: PCT/FR91/00127

§ 371 Date: Aug. 17, 1992

§ 102(e) Date: Aug. 17, 1992

[87] PCT Pub. No.: WO91/12690

PCT Pub. Date: Aug. 22, 1991

[30] Foreign Application Priority Data

Feb. 16, 1990 [FR] France ................................ 90 02151
Apr. 5, 1990 [FR] France ................................ 90 04756

[51] Int. Cl.$^6$ ...................................................... H04N 5/235
[52] U.S. Cl. .................................................. 348/229; 348/297
[58] Field of Search ................................ 358/209, 228, 358/213.19, 213.26, 213.27; 250/208.1; 348/229, 222, 362, 364, 294, 297, 207; H04N 5/225, 5/235

[56] References Cited

U.S. PATENT DOCUMENTS

| | | | |
|---|---|---|---|
| 5,157,499 | 10/1992 | Oguma et al. | 358/213.11 |
| 5,247,366 | 9/1993 | Ginosar | 358/209 |
| 5,264,940 | 11/1993 | Komiya et al. | 358/228 |

FOREIGN PATENT DOCUMENTS

| | | | |
|---|---|---|---|
| 2351550 | 12/1977 | France | H04N 5/72 |
| 2629298 | 9/1989 | France | H04N 5/30 |
| 1-200878 | 8/1989 | Japan | H04N 5/335 |

OTHER PUBLICATIONS

P. Lecturcq and G. Rey; Dunod, Paris; pp. 145–150.

*Primary Examiner*—Andrew Faile
*Assistant Examiner*—Tuan V. Ho
*Attorney, Agent, or Firm*—Oblon, Spivak, McClelland, Maier & Neustadt, P.C.

[57] ABSTRACT

A device for increasing the dynamic range of a camera comprising a lens (2) which forms a picture (6) of a scene (1) on a primary electronic image sensor (3) having a first dynamic range, a second image data source (4) corresponding to one picture of said scene (1), and an electronic image processing circuit (5), which combines the data from the primary image sensor (3) and the data from the second image data source (4) and provides image data representing the scene (1) as observed and represented by said image data, with a ratio between the brightest and dimmest areas of said scene (1) which is greater than the dynamic range of a primary image sensor (3). In various embodiments, the second image data source (4) is either a secondary image sensor or a memory which stores a previously sensed image from the primary image sensor (3). Said device preferably comprises a device (10) for controlling the sensitivity of the primary image sensor (3), and a transmissive, passive flat matrix screen (11) optically placed before the primary image sensor (3) to dim the brightest light rays passing therethrough.

21 Claims, 4 Drawing Sheets

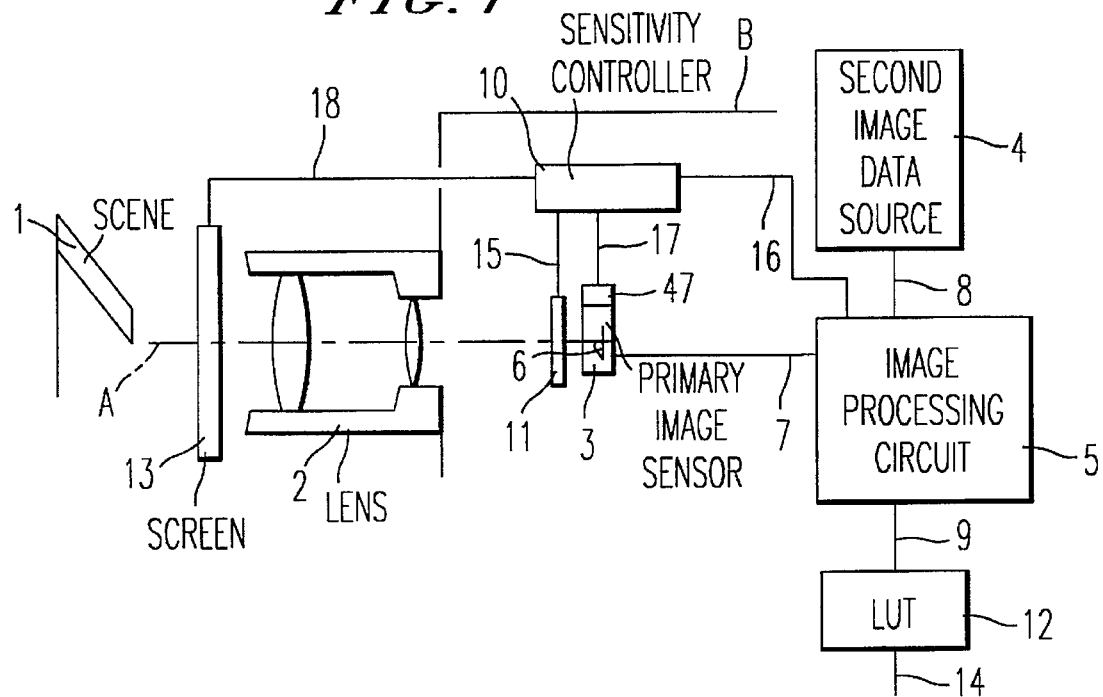
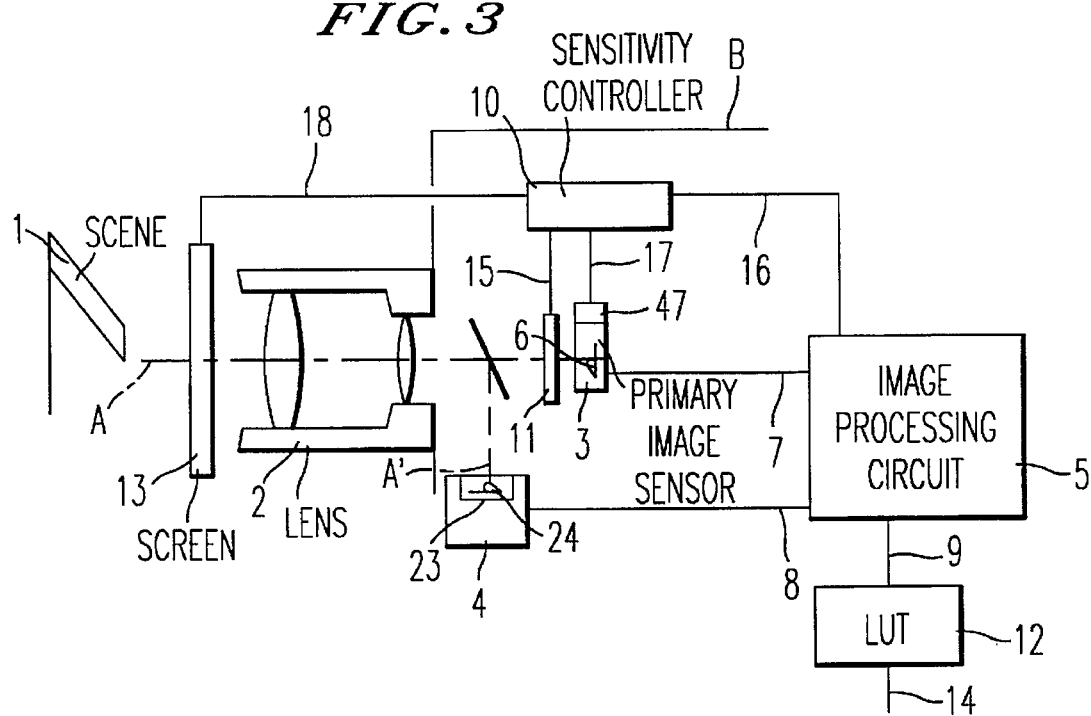

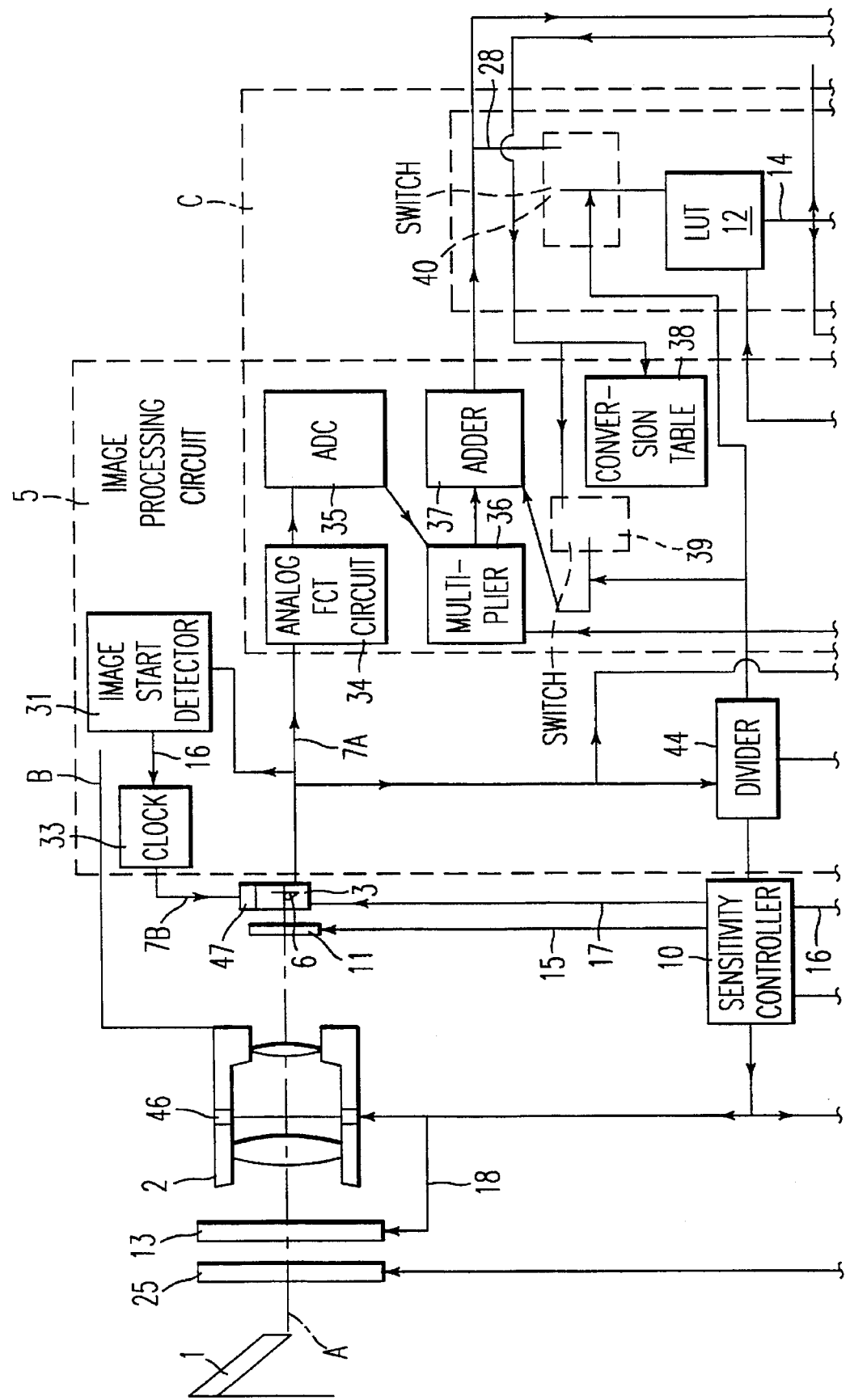

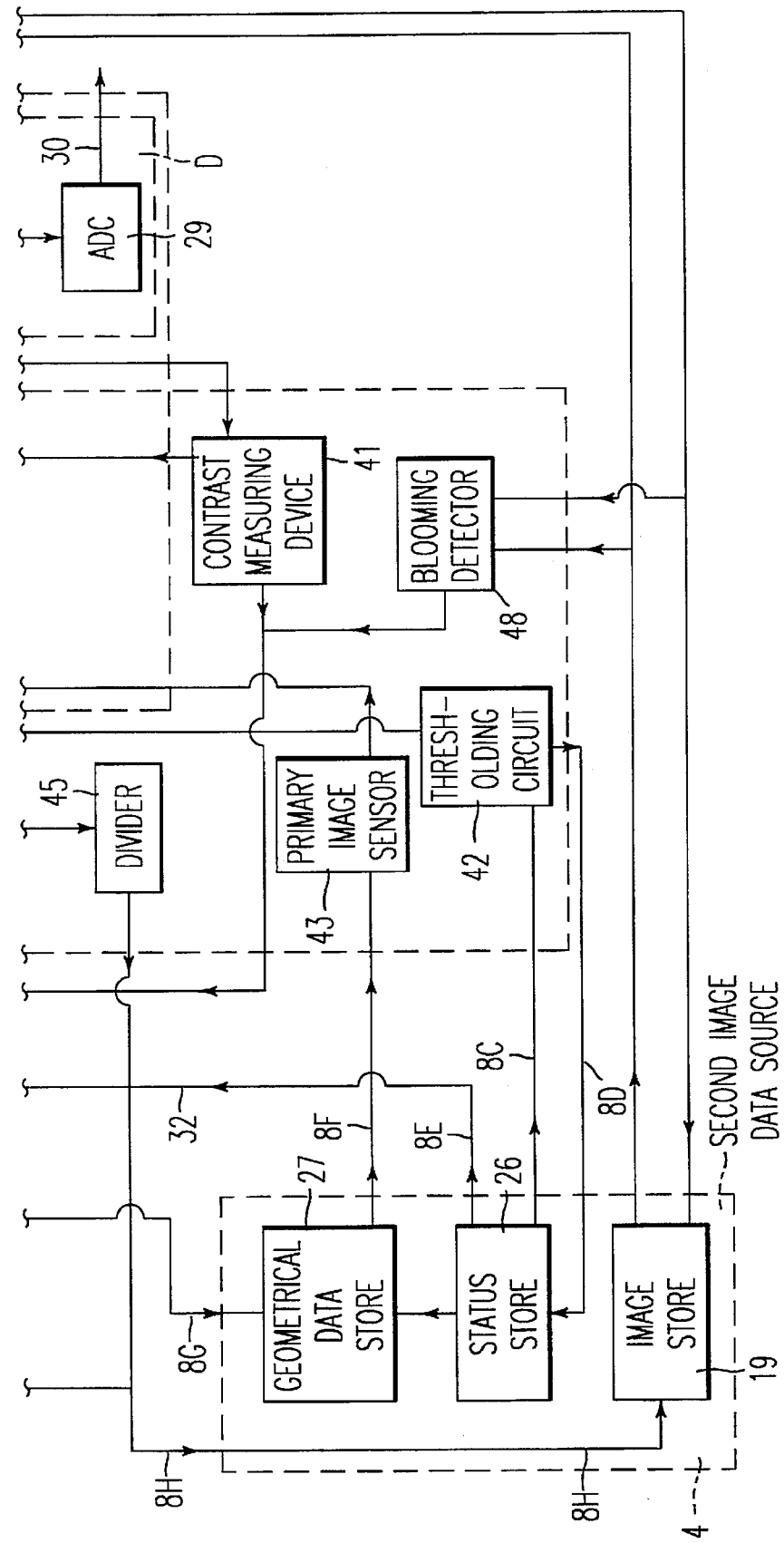

DEVICE FOR INCREASING THE DYNAMIC RANGE OF A CAMERA

BACKGROUND OF THE INVENTION

1. Field of the Invention

The present invention concerns a device for increasing the dynamic range of a camera so that it is tolerant of large differences in brightness between the points of the scene of which an image is viewed.

2. Discussion of the Background

Its applications are mainly in shooting under uncontrolled light conditions outdoors, in endoscopy and in welding robots.

Known tube or CCD type cameras are very intolerant of smearing and blooming and have a very low dynamic range (ratio of brightest to least bright areas viewed correctly and simultaneously) in the order of 100.

They are also insufficiently sensitive for shooting at night.

Other devices have an image sensor and one or more passive screens disposed optically in front of the image sensor and controlled by it which have a greater dynamic range but provide a highly unstable image. They provide closed loop matrix optical control and suffer from either oscillation of the output signal and the image transmitted or a response time very much greater than that of the image sensor.

SUMMARY OF THE INVENTION

The present invention intends to remedy these drawbacks by producing a stable image and a wide dynamic range, possibly exceeding 100 000. Also, the image produced may embody very high sensitivity.

To achieve this the device in accordance with the present invention is a device for increasing the dynamic range of a camera comprising an electronic primary image sensor operating in a spectral band and supplying image data for a range of brightness values impinging on it with a first dynamic range, said dynamic range representing the ratio of the greatest brightness value to the least brightness value of this range, and a lens forming an image of a scene on said primary image sensor characterized in that it comprises a second image data source, said image data coming from at least one image of said scene shot through said lens in the same spectral band as that of said primary image sensor and an image processing electronic circuit combining the data from the primary image sensor and the data from the second image data source and supplying image data representing the scene viewed with a ratio of the greatest brightness value to the least brightness value of areas of said scene represented by said output image data, said ratio being greater than the dynamic range of the primary image sensor.

The second image data source may comprise a secondary image sensor sensing the same image as the primary image sensor but with a different sensitivity.

The second image data source may also comprise an image store. Image data stored in said image store may represent an image sensed previously by the primary image sensor, an image resulting from processing an image previously sensed by the primary image sensor, or an image obtained from a plurality of views taken previously by the primary image sensor, combined or added together.

Other electronic circuits and additional functions are described. In particular, various image data processing systems can be adapted to suit these various embodiments. They are concerned in particular with controlling the sensitivity of the primary image sensor over all of its surface or in areas thereof by means of a matrix flat screen disposed optically in front of the primary image sensor. Other additional systems concern the output of a signal representing an image having a monotonous response (in the mathematical sense) according to the brightness of points in the scene viewed by the primary image sensor.

The following description given with regard to the appended drawings by way of non-limiting example only will provide a better understanding of the advantages, objects and features of the invention.

The dynamic range of an image sensor on which light rays impinge is the ratio of the highest to the lowest brightness areas viewed correctly and simultaneously. Between these two values the sensor outputs image data representing the brightness. The lowest value is equal to the sensitivity. Above the highest value the sensor is saturated and the image data is constant.

This description refers only to CCD type image sensors and polarizer type flat screens. Any other type of image sensor (semiconductor or tube, for example) and any other type of flat screen are within the scope of the invention, however.

The sensor comprises a photosensitive surface and circuits controlling the operation of each point on the photosensitive surface. To clarify the description the control circuits are not shown in the figures or described in detail because they are known in themselves.

Throughout the description the word "image" denotes also the "frames" output by certain image sensors in which two frames constitute one image.

To clarify the description the clock signals and the power supplies required by the various embodiments of the device are not shown.

BRIEF DESCRIPTION OF THE DRAWINGS

FIG. 1 is a diagrammatic representation of a device in accordance with the present invention.

FIG. 2 is a diagrammatic representation of a preferred first embodiment of a device in accordance with the invention comprising a single image sensor.

FIG. 3 is a diagrammatic representation of a second embodiment of a device in accordance with the invention comprising two image sensors with different sensitivities.

DESCRIPTION OF THE PREFERRED EMBODIMENTS

Figure 4:
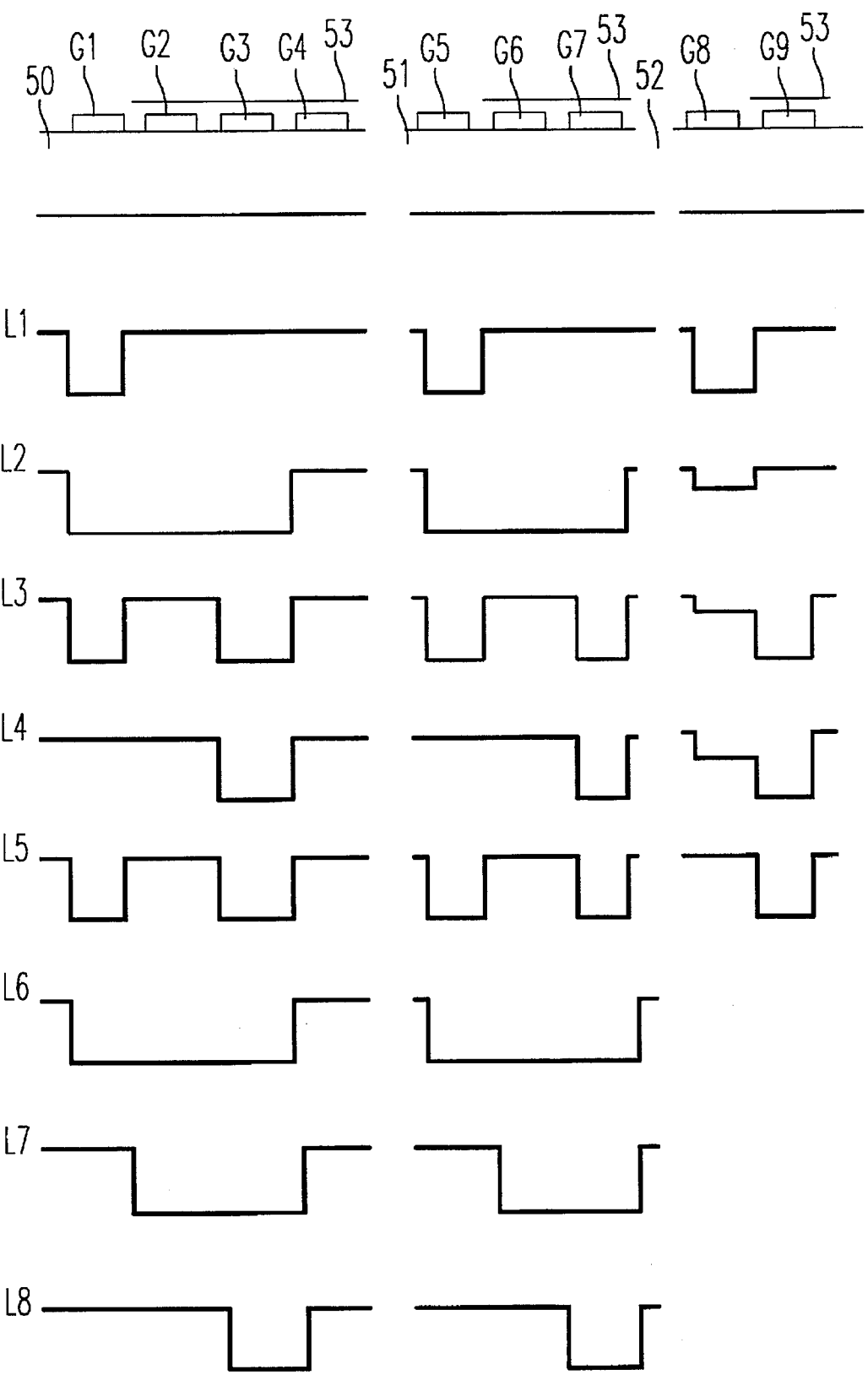
FIG. 4 is a representation of the grid control voltages of a CCD image sensor incorporated into the two embodiments of a device in accordance with the invention as shown in FIGS. 2 and 3.

FIG. 1 shows a scene 1 and on an optical axis A and in a camera casing B which is shown in part only, a flat screen 13, a lens 2 forming an image 6 of the scene 1 on an electronic primary image sensor 3 and a matrix flat screen 11 disposed optically in front of the primary image sensor 3. The primary image sensor 3 comprises an electronic shutter 47. Off the optical axis and in the camera casing B are shown a second image data source 4, an image processing electronic circuit 5 electrically connected (7) to the primary image sensor, an electrical connection 8 to the second image data source 4 and an output electrical connection 9 to a conversion table 12 which has an output electrical connection 14. The circuit 10 controlling the sensitivity of the primary image sensor 3 is connected by an electrical connection 16 to the image processing circuit 5, by an electrical connection 17 to the primary image sensor 3, by an electrical connection 18 to the flat screen 13 and by an electrical connection 15 to the matrix flat screen 11.

The electrical connections may comprise one or more electrical lines to transmit data serially or in parallel.

The lens 2 is of a known type, in particular a type known in the manufacture of video cameras, and is either interchangeable or permanently fixed to the camera casing B.

The primary image sensor 3 is of a known type, in particular a type known in the manufacture of electronic and video cameras. It senses correctly and simultaneously brightness values in a given spectral band in a limited range. Its sensitivity defines the lowest value in this range and depends on the transparency of the optical components between it and the scene 1 (this value is also called the aperture). Its dynamic range is defined, for light rays impinging on the primary image sensor 3, as the ratio of the brightness of the brightest to least bright areas that it views simultaneously and correctly. Between these two extreme values it outputs image data representing the brightness. The lowest value is equal to the sensitivity. Above the highest value the sensor is saturated and the image data is constant. In the remainder of this description the expression "response range" refers to the range of values of brightness of areas of the scene 1 for which the values of brightness at the primary image sensor 3 are between these two extreme values.

The primary image sensor 3 comprises a photosensitive surface and a circuit controlling the operation of each point of the photosensitive surface.

On the electrical connection 7 the primary image sensor 3 supplies data representing the brightness received at each point of the photosensitive surface from an area of the scene 1 and forming an image 6 on the photosensitive surface. This image data is supplied sequentially, meaning that it represents the brightness impinging at each successive point of the primary image sensor 3.

The second image data source 4 provides on the electrical connection 8 and simultaneously with the primary image sensor 3 image data representing the scene 1 shot through the lens 2. In other words, for each point of the scene 1 for which the lens 2 forms an image on a point of the primary image sensor 3, the data concerning this point of the scene 1 is transmitted simultaneously by the primary image sensor 3 and the second image data source 4.

The second image data source 4 comprises either a secondary image sensor sensing the same image as the primary image sensor 3 but with a different sensitivity (FIG. 3) or an image store in which image data from the primary image sensor 3 is stored (FIG. 2).

In the latter case the image data leaving the image store on the electrical connection 8 may represent an image viewed previously by the primary image sensor 3 with a different sensitivity to the image simultaneously leaving the primary image sensor 3, an image obtained by processing an image previously sent by the primary image sensor, or an image obtained from a plurality of views taken previously by the primary image sensor 3, combined or added together.

The data from the primary image sensor 3 and the second image data source 4 generally represents images of the scene 1 viewed with different sensitivities and so representing different ranges of brightness of points of the scene 1.

The image processing circuit 5 combines the data from the primary image sensor 3 on the electrical connection 7 with the data from the second image data source 4 on the electrical connection 8 so that data representing the scene 1 leaving the image processing circuit via the electrical connection 5 has a ratio of the greatest brightness to the least brightness of the points of the scene 1 represented by this image data greater than the dynamic range of the primary image sensor.

The image processing circuit 5 combines image data from different ranges of brightness values of the image 1 and uses each of them in full.

The combination may be a simple addition. Other modes of operation of the image processing circuit 5 are described later with reference to FIGS. 1 and 2.

A device in accordance with the invention can therefore be used to increase the dynamic range of a camera whose casing B comprises the primary image sensor 3 and the lens 2 forming am image 6 of the scene 1 on the primary image sensor 3. To this end it comprises a second image data source 4, the data coming from at least one image of said scene 1 and an image processing electronic circuit 5 combining the data from the primary image sensor 3 and the data from the second data source 4 and supplying image data representing the scene 1 with a ratio of the brightest to least bright areas of the scene 1 represented by this image data greater than the dynamic range of the primary image sensor 3.

The conversion table 12 effects an application operation (in the mathematical sense of the term) on the two sets of signal values, one reaching it on the connection 9 and the other leaving on the connection 14. To this end the conversion table comprises, for example, a store to which the address bus is connected at the connection 9 and the data bus is connected at the connection 14. The store is loaded beforehand by a device that is not shown. It may be a dynamic or static random access memory or a read only memory, possibly programmable. The advantage of the conversion table is that it formats the image data leaving the device so that it is easier to display on a monitor.

The flat screen 13 controlled by the circuit 10 to control the sensitivity of the primary image sensor 3 via the electrical connection 18 has a transmittance which is controlled electrically over a single area of optical operation. To this end the flat screen 13 may comprise a flat liquid crystal screen of the nematic or ferro-electric type, for example, between two polarizers.

The flat screen 13 varies the sensitivity of the primary image sensor 3 as its transmittance varies.

The matrix flat screen 11 has an array of points at which the transmittance is independently controlled by electrical means. To this end the matrix flat screen 11 may comprise a liquid crystal screen, for example, as used in some pocket TVs. An electrical signal controlling the transmittance of each point of the matrix flat screen 11 is sent over the electrical connection 15 by the circuit 10 controlling the sensitivity of the primary image sensor 3. The transmittance of each point of the matrix flat screen 11 controls the sensitivity of the points of the primary image sensor 3 which is optically on its output side.

Depending on data transmitted to it on the electrical connection 15 by the image processing circuit 5 the circuit 10 controlling the sensitivity of the primary image sensor 3 controls the transparency of each point of the matrix flat screen 11 according to a decreasing function of the brightness received by the points of the primary image sensor 3 which are optically on the output side of said point of the matrix flat screen 11.

As a result the sensitivity of the points of the primary image sensor 3 is a decreasing function of the brightness of the light impinging on it.

Finally, the opto-electronic operation of each point of the primary image sensor 3 is controlled by the control circuit 10.

The control circuit 10 controls the duration of this opto-electronic operation by controlling the electronic shutter 47 of the primary image sensor 3. To this end it sends over the electrical connection 17 either a pulse with a duration equal to that of this opto-electronic operation or a code representing this duration, depending on which type of primary image sensor 3 is used. The variation of the duration of opto-electronic operation of the primary image sensor 3 controlled by the electronic shutter 47 represents a variation of the sensitivity of the primary image sensor 3.

The circuit 10 also controls the control voltage of each point of the primary image sensor 3. Finally, it controls independently the duration of opto-electronic operation of each point of the primary image sensor 3. For the latter two functions the primary image sensor 3 must be adapted accordingly and matrix connections to each point of the primary image sensor 3 must be electrically accessible via the control circuit 10.

Note that, in accordance with the invention, the potential areas or grids of each point of the primary image sensor 3 may be controlled individually so that the opto-electronic generation of electrical charge at each photosensitive point is a decreasing function of the brightness of the light reaching this point. The grid potentials are controlled by the sensitivity control means 10 in the same way as the matrix flat screen 11 is controlled (matrix control).

In a first embodiment the primary image sensor 3 views images with alternating high and low sensitivity under the control of the sensitivity control circuit 10. The second image data source 4 comprises an image store which stores image data and outputs it as explained above and the image processing electronic circuit 5 combines the data leaving the store and the primary image sensor 3.

In a second embodiment the primary image sensor 3 views images with constant sensitivity, the second image data source 4 comprises a store in which the data leaving the image processing circuit 5 is stored and the image processing circuit 5 produces a weighted mean of the image data from the primary image sensor 3 and the store with a weighting coefficient varying according to the luminous intensities represented by the image data and producing an image at the same frequency as the primary image sensor 3. In this second mode of operation the data stored in the image store represents a sensitivity and a dynamic range greater than the data from the primary image sensor 3.

In a third operating mode the primary image sensor 3 operates at a high frequency, the second image data source 4 comprises a store in which data leaving the image processing circuit at the same high frequency is stored and the image processing circuit combines in the store data coming successively from the primary image sensor 3 and data stored in the store and reading the store at a lower frequency that the operating frequency of the primary image sensor and so producing output image data at this lower frequency.

In a fourth operating mode the second image data source 4 comprises an array of stores on the primary image sensor component 3 beside each point of its photosensitive surface and the image processing circuit 5 controls the transfer of image data from each point of the photosensitive surface to the juxtaposed store according to the incident brightness at said point and then reads the store to produce the output scene image data. One example of this fourth mode of operation is described with reference to FIG. 4.

In a fifth mode of operation the second image data source comprises a store holding flat screen 11 status data and/or data reflecting the effect of each point of the matrix flat screen 11 and the image processing circuit calculates for each point of the primary image sensor 3 the transparency of the optical system on its input side and the brightness of the area of the scene 1 from which light reaches said point of the primary image sensor 3.

These five operating modes are described with reference to FIG. 2 which shows a preferred embodiment.

In another embodiment described with reference to FIG. 3 two image sensors simultaneously sense the same image with different sensitivities and supply image data to the image processing circuit which combines this data.

Various optical or electronic image data processing systems can be used in these two embodiments, in particular to control the sensitivity of the primary image sensor 3 over all of its surface or by areas using the matrix flat screen 11 and to convert a monochrome camera into a high-resolution color camera.

FIG. 2 shows a scene 1 and on an optical axis A and in a camera body B shown in part a trichrome flat screen 25, a flat screen 13, a lens 2 forming an image 6 of the scene 1 on an electronic primary image sensor 3, an electrically operated diaphragm 46 and a matrix flat screen 11 disposed optically on the input side of the primary image sensor 3.

The primary image sensor comprises an electronic shutter 47.

Off the optical axis and in the camera casing B are shown a second image data source 4 comprising an image store 19, a matrix flat screen 11 status store 26, a geometrical data store 27, an image processing electronic circuit 5 having two electrical connections 7A and 7B to the primary image sensor 3, eight electrical connections 8A, 8B, 8C, 8D, 8E, 8F, 8G and 8H to the second image data source 4, the electrical connections 8A, 8B and 8G being connected to the image store 19, the electrical connections 8C, 8D and 8E being connected to the matrix flat screen 11 status store 26, the electrical connections 8F and 8G being connected to the geometrical data store 27 and an output electrical connection 28 connected indirectly to a conversion table 12 having an output electrical connection 14. A circuit 10 controlling the sensitivity of the primary image sensor 3 has its inputs connected by an electrical connection 16 to the image processing circuit 5 and by an electrical connection 32 to the status store 26 and has its outputs connected by an electrical connection 17 to the primary image sensor 3, by an electrical connection 18 to the flat screen 13 and by an electrical connection 15 to the matrix flat screen 11 and to the electrical diaphragm 46. Outputs of the status store 26 are respectively connected to an input of the geometrical data store 27 and to an input of the control circuit 10.

The conversion table 12 has a data input connection 9 and has its output electrically connected to a digital-analog converter 29 having an output connection 30.

The image processing circuit 5 comprises a start of image detector 31 connected to the output of the primary image sensor 3 and a sequencer 33 controlling the grid potential having its input connected to the start of image detector 31 and its output connected to the electrical connection 7B of the primary image sensor 3. The image processing circuit 5 comprises an analog function circuit 34, an analog-digital converter 35, a multiplier 36 and an adder 37 connected in succession. The adder 37 has its output connected to the connection 7B and its input connected to a switch 40 whose second input is connected to the connection 8A and whose single output is connected to the connection 9 of the conversion table 12. A switch 39 connects to the adder 37 one of its two inputs connected to a conversion table 38 and to the connection 8A. The conversion table 38 has its input connected to the output of the switch 40. Contrast measuring means 41 have their input connected to the connection 14 and the output connected to the conversion table 12 and to the circuit 10 controlling the sensitivity of the primary image sensor 3. A blooming detector 48 has its inputs connected to the connections 8A and 8B and its output connected to the control circuit 10. A variable threshold circuit 42 has its input connected to the output of the primary image sensor 3 and to the matrix flat screen 11 status store 26 and its output connected to said status store 26. A computer 43 has its inputs connected to the status store 26 and to the geometrical data memory 27 and its output connected to the multiplier 36. A divider by two 44 has its input connected to the output connection 7A of the primary image sensor 3 and its output connected to the control circuit 10, to position control means for the switches 39 and 40 and to a divider by three 45 connected to the trichrome flat screen 25.

The electrical connections may comprise one or more electrical lines in order to transmit data serially or in parallel.

A circuit D comprises the switch 40, the conversion table 12 and the digital-analog converter 29. A circuit C comprises the circuits of circuit D and the analog function circuit 34, the analog-digital converter 35, the multiplier 36, the adder 37, the switch 39 and the conversion table 38.

The electronic primary image sensor 3 is of a known type, in particular a type known in the manufacture of video cameras. It senses correctly and simultaneously a limited range of brightness values reaching it in a given spectral band. Its sensitivity defines the lowest value of this range and depends on the transparency of the optical components which separate it from the scene 1. This parameter is also referred to as the aperture. Its dynamic range is defined as the ratio of the greatest and least brightness values that it views simultaneously and correctly. Between these two extreme values it outputs image data representing the brightness. The lowest value is equal to the sensitivity. Above the highest value the sensor is saturated and the image data is constant. In the following description the term "response range" refers to the range of brightness values of areas of the scene 1 for which the values of brightness impinging on the primary image sensor 3 are between these two extreme values.

The sensor comprises a photosensitive surface and a circuit controlling the operation of each point of the photosensitive surface.

On the electrical connection 7A the primary image sensor 3 supplies data representing the brightness received at each point of its photosensitive surface from an area of the scene 1 and forming an image 6 on the photosensitive surface. This image data is supplied sequentially, in other words it represents the brightness impinging on each point of the primary image sensor 3 in succession.

The image store 19 included in the second image data source 4 supplies on the electrical connection 8A and simultaneously with the primary image sensor 3 image data representing the scene 1 viewed through the lens 2. This means that for each point of the scene 1 for which the lens 2 forms an image at a point of the primary image sensor 3 the data concerning this point of the scene 1 is sent simultaneously by the primary image sensor 3 and the second image data source 4.

The image store 19 stores image data received over the connection 8B from the primary image sensor 3 following processing by the image processing circuit 5. The function of the analog function circuit 34 is to amplify the weaker signals leaving the primary image sensor 3 without amplifying the stronger signals. The analog function circuit 34 implements a logarithmic function, for example, retaining the extreme values of the image data leaving the primary image sensor 3. The analog-digital converter 35 converts into the form of parallel digital data the signal leaving the analog function circuit 34. The multiplier 36 multiplies the numerical values produced by the analog-digital converter 35 by numerical values produced by the computer 43. How the computer 43 supplies numerical values representing the transparency of the matrix flat screen 11 for each point of the primary image sensor 3 is described later. The adder 37 adds the numerical values produced by the multiplier 36 and the numerical values produced by the switch 39.

The divider by two 44 advises the control circuit 10 of the parity of the number of the image transmitted by the primary image sensor 3 and switches the switches 39 and 40 in parallel.

For the sake of clarification, the operating modes described hereinafter explain the function of each of the components described with reference to FIG. 2.

In a first operating mode the circuit 10 controlling the sensitivity of the primary image sensor 3 alternates the mean sensitivity of the primary image sensor 3 between two values supplied to it by the contrast measuring means 41, by controlling the flat screen 13, the electrically operated diaphragm 46 and the electronic shutter 47 of the primary image sensor 43.

While the control circuit 10 selects the higher sensitivity of the primary image sensor 3 the switch 39 connects the output 8A of the image store 19 to the input of the adder 37 and the switch 40 connects the adder 47 to the conversion table 12. The switches 39 and 40 are in the opposite position while the control circuit 10 selects the lower sensitivity of the primary image sensor 3. In this way the data at the outputs 14 and 30 of the device represents the sum of the data from two different response ranges of the primary image sensor 3. The dynamic range of the camera is then the product of the dynamic range of the primary image sensor and the ratio of the lowest sensitivity, expressed in lux, to the highest sensitivity.

The control circuit 10 controls the duration of optoelectronic operation by controlling the electronic shutter 47 of the primary image sensor 3. It sends over the electrical connection 17 either a pulse of duration equal to that of opto-electronic operation or a code representing this duration, depending on the type of primary image sensor 3 used.

Note that the number of different sensitivities selectable by the control circuit 10 may be more than two, in which case the switches 39 and 40 have the same number of positions and the divider 44 divides by this number.

In a second mode of operation the circuit 10 controlling the sensitivity of the primary image sensor 3 does not alternate the sensitivity of said sensor. The switches 39 and 40 are locked in such a way that the conversion table 38 is connected to the adder 37, the setting of the switch 40 being immaterial. The conversion table 38 defines a function which increases and then decreases according to the numerical values "$\underline{x}$" arriving at its input. For example, this function is of the form ((nth root of x) less x) divided by maximum x.

Accumulation therefore occurs in the image store 19, in inverse proportion to the value $\underline{x}$. In this way the sensitivity and dynamic range of the camera are increased and the remanence effects are restricted to the lowest values for which the effects are less perceptible. The increased dynamic range results from the increased signal to noise ratio due to the high accumulation for low values of $\underline{x}$ for which the noise is greater. For the forms of function mentioned above the response of the camera is of the nth root of $\underline{x}$ form.

In a third mode of operation the device operates as in the second mode of operation except that the switch 40 is in a fixed setting and the conversion table 12 is connected at all times to the image store 19. The image sensor operates at a high frequency and the conversion table 12 reads the image store 19 at a low frequency. In this way the increased dynamic range of the camera is similar to that explained in the second mode of operation but the remanence is attenuated.

In a fourth mode of operation the device operates as in the third mode of operation except that the setting of the switch 39 changes and this switch does not connect either of its inputs to its output during a period in which the primary image sensor 3 produces an image after each period of reading the image store 19 by the conversion table 12. In this way there is no remanence at the output of the device because the data in the image store 19 is renewed on each read.

Fifth and sixth modes of operation use control of the matrix flat screen 11 to vary the sensitivity of the primary image sensor 3 matrix fashion.

The matrix flat screen 11 has an array of points whose transmittance is controlled individually by electrical means. To this end the matrix flat screen 11 may comprise a liquid crystal screen, for example, as used in some pocket TVs. An electrical signal controlling the transmittance of each point on the matrix flat screen 11 is sent over the electrical connection 12 by the circuit 10 controlling the sensitivity of the primary image sensor 3. This signal is supplied to the control circuit 10 by the status store as explained hereinafter. The transmittance of each point of the matrix flat screen 11 controls the sensitivity of the points of the primary image sensor 3 which are optically on its output side.

Depending on the data transmitted to it over the electrical connection 16 by the image processing circuit 5, the circuit 10 controlling the sensitivity of the primary image sensor 3 controls the transparency of each point of the matrix flat screen 11 according to a decreasing function of the brightness received by the points of the primary image sensor 3 which are optically on the output side of said point of the matrix flat screen 11.

In this way the sensitivity of the points of the primary image sensor 3 is a decreasing function of the brightness of the light impinging on it.

For any point of the matrix flat screen 11 the geometrical data store 27 holds values defining its optical effect at each point of the primary image sensor 3 which is optically on its output side. These values depend on the distance between the matrix flat screen 11 and the primary image sensor 3, on the position and the aperture of the electrical diaphragm 46 and on the darkened state of the points of the matrix flat screen 11 surrounding said any point. This effect is the result of the projection of points of the matrix flat screen 11 onto the photosensitive surface of the primary image sensor 3 by the light rays from the scene 1 via the electrical diaphragm 46. The electrical diaphragm 46 being connected to an input of the geometrical data store 27, together with the matrix flat screen 11 status store 26, the geometrical data store 27 can supply the optical effect values to the computer 43. This computes the reciprocal of the optical attenuation factor of light rays impinging on each point of the primary image sensor 3. This reciprocal is multiplied by the value of brightness at said point by the multiplier 36, the output values of the multiplier representing a constant overall sensitivity of the photosensitive surface of the primary image sensor 3. Because it depends on the actual scene 1, the control of the matrix flat screen 11 is stable. This represents the fifth mode of operation.

In the sixth mode of operation of this device in accordance with the present invention the matrix flat screen 11 status store 26 prevents image oscillations due to the closed loop control. To this end the variable threshold circuit 42 compares for each photosensitive point of the primary image sensor 3 the brightness value impinging on this point, which value is supplied over the connection 7A from the primary image sensor 3, with a threshold dependent on the transparency of the point of the matrix flat screen 11 which is optically on the input side of this point of the sensor, as indicated by the state store 26. Depending on this transparency a threshold is determined. If the threshold is exceeded for at least one point of the primary image sensor 3 on the output side of said point of the matrix flat screen 11 the variable threshold circuit 42 commands maximum darkening at this point of the matrix flat screen 11 by sending data to the state store 26. If the threshold is not exceeded for any point of the primary image sensor 3 which is optically on the output side of said point of the matrix flat screen 11 the variable threshold circuit commands the maximal transmittance at this point of the matrix flat screen 11 by sending different data to the state store 26. In this way, for a fixed scene 1, the flat screen 11 commands are constant, the maximum threshold variation representing the maximum contrast of the matrix flat screen 11. No oscillation of the status of points of the matrix flat screen 11 or of the image data leaving the primary image sensor 3 is possible.

Note that for each point of the matrix flat screen the ratio of the respective optical attenuation on the point of the primary image sensor 3 which is optically on its output side to the minimal optical attenuation is always less than the ratio of the threshold used to the minimal threshold. It is this geometrical optical effect of projection by the light rays passing through the electrical diaphragm 46 of points of the matrix flat screen 11 onto the primary image sensor 3 which renders control stable.

Note also that this mode of operation is described for a flat screen having only two states, one transparent and the other opaque, at each point. It will be easy for the man skilled in the art to adapt this disclosure to a flat screen having intermediate levels of transparency, thresholds representing these levels of transparency being then used subject to the stability of control rule explained above.

For the fifth and sixth modes of operation note that the data stored in the state store 36 represents at least one image of the scene 1 viewed through the lens 2. The image processing circuit 5 combines this data with data from the primary image sensor 3 and outputs image data of the scene 1 representing a dynamic range greater than that of the primary image sensor 3.

A seventh operating mode uses the start of image detector 31 and the grid potential control sequencer 33.

The start of image detector 31 advises the grid potential control sequencer 33 of the start of an image leaving the primary image sensor 3 in the form of image data.

The sequencer 33 then sends potential signals to the grids of the primary image sensor 3 in such a way that a partial transfer of electrical charge occurs from its surface to its output 7A as explained later, in an example referring to a CCD primary image sensor structure. In this example, for a primary image sensor 3 comprising four potential areas side by side for each point of the photosensitive area, said potential areas have a potential commanded by the sequencer 33, four grids each defining a potential for all the identical areas of these points are accessible by the sequencer 33. Thus all the photosensitive points of the primary image sensor 3 have simultaneously the same electrical potential configuration on their four potential areas. By way of explanation, there will be described the operation of a primary image sensor 3 controlled by the sequencer 33 and having four grids of which the first represents the photosensitive areas of each photosensitive point, the next two represent the charge transfer areas and the last represents a potential barrier or drain preventing electrical connection between the areas of two adjacent points. The last three grids therefore represent areas of points of the primary image sensor 3 which are not photosensitive and do not have any opto-electronic function.

Throughout the operation as described hereinafter, the fourth grid (i.e. the potential barrier or drain) remains in a state such that the electrons cannot cross it.

In a first time period the sequencer 33 commands opto-electronic operation of long duration at the photsensitive areas, i.e. the first grid. At this time the second and third grids do not contain any electrical charge. In a second time period the sequencer commands the same potential at the first three grids. In this way the electrical charges initially in the first area are partially transferred into the second and third areas. In a third time period the potential of the second grid is modified so that the electrical charges can no longer pass from the first to the third area. In a fourth time period the potential of the first grid is modified so that the charges retained by the first area are eliminated or transferred to a substrate or a drain. At this time only the third area retains electrical charges, the sum of these electrical charges being a fraction of the sum of the electrical charges generated in the first time period in the first area. Saturation of the third area is therefore impossible. In a fifth time period the potential of the first grid is changed to restart opto-electronic operation of the first area during a period shorter than the first time period. In a sixth time period the electrical charges in the first area are transferred in their entirety into the third area via the second area in the usual way. Finally, in a seventh time period the charges are transferred from the third area to an image data output of the primary image sensor 3 in the usual manner. In this way these charges represent some of the charges resulting from the first period of opto-electronic operation and charges resulting from the fifth period of opto-electronic operation.

This seventh mode of operation of the device makes it possible to implement the same operations as in the first mode of operation in a store in the primary image sensor 3, the store being made up of the third photosensitive point areas of said primary image sensor 3. In other words, the image data leaving said store on the primary image sensor 3 includes data representing two views with different sensitivities of the primary image sensor 3. This data represents a dynamic range greater than that of the primary image sensor 3.

Note that the second and third time periods described above can be respectively replaced by the eighth and ninth time periods described below. The eighth time period is identical to the second time period except that the third grid is at a potential which does not allow transfer of electrical charges within it. The ninth time period is identical to the third time period, the potentials of the second and third areas being progressively interchanged. The result in respect of the positions of the electrical charges in the fourth time period is the same as previously.

Other grid or potential control sequences sent to the primary image sensor are within the scope of the invention, especially if the number of areas per point of the primary image sensor or the number of grids used is different than that used hereinabove. Another example of grid potential control sequence effected by the sequencer 33 is shown in FIG. 4. For a better understanding of this seventh mode of operation reference may usefully be had to works describing the physics of semiconductor active components and in particular the work on this subject by P. Leturcq and G. Rey published in the French language by éditions Dunod, Paris, and in particular pages 145 through 150 which are hereby incorporated in the present description.

In addition to the seven modes of operation described above and which are combined to add their dynamic range enhancement effects, the invention proposes various systems of enhancing image data quality, especially in the case of blooming or smearing.

The effect of smearing in images from the primary image sensor 3 is reduced by darkening the flat screen 13 when the primary image sensor 3 is not sensitive, in other words when opto-electronic operation is not requested, or when the electronic shutter is closed. In a device in accordance with the present invention as shown in FIG. 2 the circuit 10 controlling the sensitivity of the primary image sensor 3 controls the darkening of the flat screen 13 by means of a clock (not shown).

The contrast measuring means 41 measures the variations in the numerical values leaving the device. It can measure the quadratic difference as compared with the mean numerical value. It can also detect the extreme numerical values. The contrast measurement is supplied to the sensitivity control circuit 10 and to the conversion table 12. The sensitivity control circuit 10 uses this data to control variations in the sensitivity of the primary image sensor 3 accordingly. The conversion table comprises a plurality of transfer functions suited to different values of contrast for optimizing the display of image data leaving the device.

The blooming detector 48 compares the values entering and leaving the image store 19. These images represent different sensitivities. To prevent blooming occurring in the most sensitive image, the blooming detector 48 verifies that for the saturation value of the data from an image viewed with the highest sensitivity there is a non-null value of data from an image viewed with the lowest sensitivity. The data representing these two images is present on the connections 8A and 8B in the first mode of operation of the device. The detection of blooming is reported to the sensitivity control circuit 10 which commands a smaller difference in sensitivity between successive images by means of the flat screen 13, the electric diaphragm 46 and the electronic shutter 47.

The conversion table 12 can be used to enhance the image leaving the device. In particular, conversion functions which increase and then decrease create a polarization effect enhancing the perception of the image.

With a monochrome primary image sensor 3 three circuits D must be incorporated into the device, each representing one of the primary colors. The electrical connection 8H connecting the divider by three 45 and the image store 19 selects the memory plane of the image store 19 representing the color transmitted by the flat trichrome screen 25 as described hereinafter. The flat trichrome screen 25 which is controlled by the circuit 10 controlling the sensitivity of the primary image sensor 3 has a transmittance controlled electrically in a single cooperating area for each of the primary colors. To this end the flat trichrome screen 25 may incorporate three flat liquid crystal screens, for example nematic or ferroelectric screens, and three dichroic polarizers between which are disposed the liquid crystal flat screens and a conventional polarizer. The dichroic polarizers filter one color on one polarization axis and are transparent on a polarization axis perpendicular to the first. The conventional polarizer is transparent on one polarization axis and opaque on the polarization axis perpendicular to the first. The alternating disposition along the optical path of a red-transparent dichroic polarizer, a liquid crystal screen, a green-transparent dichroic polarizer, a liquid crystal screen, a blue-transparent dichroic polarizer, a liquid crystal screen and a conventional polarizer selects the color transmitted by the flat shutter 13.

The transmittance of the flat trichrome screen 25 varies the sensitivity of the primary image sensor 3 for each of the primary colors.

With a color primary image sensor 3 three circuits C must be incorporated into the device each representing one primary color. A switch (not shown) at the input of each circuit C selects the data respective to each color. The flat trichrome screen and the divider by three 45 are not required.

Opto-electronic operation of each point of the primary image sensor 3 is controlled by the control circuit 10.

The control circuit 10 controls the operating voltage of each point of the primary image sensor 3. It controls independently the duration of opto-electronic operation of each point of the primary image sensor 3. The primary image sensor 3 must be adapted for these functions and matrix connections with each of the points of the primary image sensor 3 must be electrically accessible to the control circuit 10.

It is clear that a device in accordance with the present invention may comprise fewer functions than all those described with reference to FIGS. 1 and 2 whilst achieving in accordance with the invention an increase in the dynamic range of the primary image sensor.

In each operating mode the image data held by the second image data source represents an image with a range of brightness variation different than that of the primary image sensor 3, for which this range of variation is called the dynamic range.

FIG. 3 shows a scene 1 and on an optical axis A and in a camera casing B which is partially shown a flat screen 13, a lens 2 forming an image 6 of the scene 1 on a primary image sensor 3, light splitting means 21 and a matrix flat screen 11 disposed optically on the input side of the primary image sensor 3. Off the optical axis and in the camera casing B are shown a second image data source 4 comprising a secondary image sensor 23 on which the lens 2 forms an image 24 of the scene 1 similar to the image 6, an image processing electronic circuit 5 having an electrical connection 7 to the primary image sensor 3, an electrical connection 8 to the second image data source 4 and an output electrical connection 9 connected to a conversion table 12 having an output connection 14. A circuit 10 controlling the sensitivity of the primary image sensor 3 is connected by an electrical connection 16 to the image processing circuit 5, by an electrical connection 17 to the primary image sensor 3, by an electrical connection 18 to the flat screen 13 and by an electrical connector 15 to the matrix flat screen 11.

The components and functions of this second embodiment of the device are identical to those described with reference to FIGS. 1 and 2 except for the second image source 4 and the light splitting means 21.

The function of the light splitting means 21 is to split light rays impinging on it into two light rays of which one propagates towards the primary image sensor 3 and the other towards the secondary image sensor 23. To this end it may comprise partially reflecting mirrors, transparent plates, optionally with surface treatment, optical prisms such as those used in cameras with three image sensors each sensing one color, or an image transfer lens.

The second image data source 4 comprises a store identical to that described with reference to FIG. 2. It also comprises a secondary image sensor 23 which senses an image 24 similar to the image 6 with a sensitivity different than that of the primary image sensor 3. To this end the transparency or the aperture of the optical system in front of the secondary image sensor 23 is different than that of the optical system in front of the primary image sensor 3.

The image sensors 3 and 23 therefore provide representative data for different ranges of values of brightness of points of the scene 1. The image processing circuit 5 combines this data to provide on an electrical output connection 9 data representing the combination of these two ranges of brightness values of points of the scene 1.

FIG. 4 shows at the top the grids of the charge-coupled devices of an electronic image sensor and, lower down, vertically aligned with the latter, grid potential states at consecutive times, these potentials being imposed by the grid potential sequencer shown in FIG. 2.

At the top are shown grids G1, G2, G3, G4 on a substrate 50, grids G5, G6, G7 on a substrate 51 and grids G8 and G9 on a substrate 52. The substrates 50, 51 and 52 respectively represent image sensors with four, three and two grids per photosensitive point of the photosensitive surface.

Masks 53 shade the grids G2, G3, G4, G6, G7 and G9 which are intended to transfer charge created opto-electronically to the grids G1, G5 and G8.

The first curved line L1 represents the potential during viewing, i.e. during formation of charges on the grids G1, G5 and G8. The subsequent lines show, for successive times from top to bottom, the transfer of charge between the grids. Points on these curves above the axes represent positive potentials and below the axes represent negative potentials. The positive potential points constitute a barrier for holes, these being the charge carries transferred in the charge-coupled devices. The negative potential points represent potential wells where the hole charges are retained. The charge positions are represented by the symbol "+".

In line L1, grids G1, G5 and G8 have a negative potential and the other grids have a null potential. At this time the positive electrical charges are generated and retained by the grids G1, G5 and G8. In line L2, the grids G1, G2, G3, G5, G6 have a negative potential, the other grids having a null potential except for the grid G8 which has a very low negative potential. At this time the charges from grids G1 and G2 are respectively distributed under the grids G2 and G3 on the one hand and the grids G6 and G7 on the other hand. The charges generated under the grid G8 are partially dissipated into the grid G8. In line L3 grids G1, G3, G5, G7 and G9 are at negative potentials, the other grids being at a null potential. At this time only some of the charges initially generated under the grids G1, G5 and G8 are retained under the grids G3, G7 and G9. In line L4 grids G3, G7 and G9 are at negative potentials, the other grids being at a null potential except for grid G8 which is at an intermediate negative potential. The charges present under the grids G1 and G5 are absorbed by the grids G1 and G5. New charges are generated under the grid G8, representing a second view. In line L5 grids G1, G3, G5, G7 and G9 are at negative potentials, the other grids being at a null potential. At this time new charges have been generated under the grids G1 and G5 representing a second view. Charges created during the second view (line L4) under grid G8 are transferred under grid G9. After line L5 the cycle of operation of grids G8 and G9 is completed and the potential state of the grids is not shown. In line L6 grids G1, G2, G3, G4, G5 and G6 are at a negative potential, grid G4 being at a null potential. In line L7 grids G2, G3, G6 and G7 are at negative potentials, grids G1, G4 and G5 being at null potentials. In line L8 grids G3 and G7 are at negative potentials, grids G1, G2, G4, G5 and G6 being at null potentials. The last three lines represent the transfer of charges generated during the second view (line L5) under grids G1 and G5 under grids G3 and G7.

At the end of this sequence grids G3, G7 and G9 retain charges whose number is the sum of the charges created during the second view with some of the charges created during the first view (line L1).

The second view is preferably of shorter duration or at lower sensitivity than the first. In this way saturation cannot occur.

Grids G3, G7 and G9 form an array of stores disposed in the primary image sensor constituting in accordance with the present invention a second image data source.

Other sequences, in particular adapted to other types of CCD image sensors, may be used by the man skilled in the art within the scope of the invention. Note that in accordance with the invention the potential areas of grids of each point of the primary image sensor can be controlled individually so that the opto-electronic generation of electrical charges at each photosensitive point is a decreasing function of the brightness of light impinging on this point. The potential of the grids is controlled by the sensitivity control means 10 in the same way as the matrix flat screen 11 is controlled (matrix control).

A device in accordance with the present invention may be implemented for addition to any previously existing electronic camera or incorporated into the casing of a camera. Starting with any monochrome camera, it can increase the dynamic range, increase the sensitivity and convert the camera into a high-definition color camera.

The main applications of a device in accordance with the present invention are shooting under uncontrolled light conditions outdoors, in endoscopy and in welding robots, for example.

I claim:

1. Device for increasing the dynamic range of an electronic image sensor comprising photosensitive elements for supplying successive signals representing images formed successively at the photosensitive elements, and sensitivity control means for varying the lowest level of brightness of images successively sensed by the electronic image sensor for each image, an image store having an input electrically connected to said image sensor, said image store being adapted to store the image data received from said image sensor and send a signal previously stored, image data simultaneously output by said image sensor and said image store corresponding to a same one of said photosensitive elements having different lowest levels of brightness, and electronic image processing circuit means for combining image signals received directly from said image sensor and image signals received via said image store for supplying at an output connector an image signal having a greater dynamic range than said image sensor.

2. Device according to claim 1, further comprising a flat screen optically in front of the image sensor and having an electronically controlled transmittance area, the sensitivity control means controlling the transmittance of the flat screen so that the transmittance of the flat screen is alternately high and low during viewing by the electronic image sensor.

3. Device according to claim 2, wherein the sensitivity control means senses a control signal representing the low transmittance of the flat screen between successive views by the image sensor.

4. Device according to claim 1, wherein the sensitivity control means controls the sensitivity of the elements of the image sensor matrix fashion and varies the sensitivity independently.

5. Device according to claim 4, wherein the sensitivity control means independently controls opto-electronic operation duration of each of the photosensitive elements of the image sensor.

6. Device according to claim 4, wherein the sensitivity control means independently controls conversion of photons into electrons at each of the photosensitive elements of the image sensor.

7. Device according to claim 4, further comprising a passive matrix flat screen, the sensitivity control means controlling the transparency of the matrix flat screen, said matrix flat screen being disposed optically in front of the image sensor, the transparency of each of the elements being a decreasing function of brightness represented by the image signal at the output of the image processing circuit and the respective brightness at the photosensitive elements of the image sensor disposed optically after said element of the matrix flat screen.

8. Device according to claim 7, further comprising a second image store holding data on the transparency of each of the elements of the matrix flat screen, said second store having an output connected to the input of the image processing circuit.

9. Device according to claim 4, further comprising a geometrical data store holding at least one sensitivity indication for each of the elements of the image sensor.

10. Device according to claim 1, further comprising blooming detector means for comparing point by point data representing two images viewed successively by the electronic image sensor with different sensitivities, the output of the blooming detector means being connected to an input of the sensitivity control means.

11. Device according to claim 10, wherein the sensitivity control means reduces the sensitivity differential between successive images when the output from the blooming detector means indicates blooming.

12. Device according to claim 1 wherein the sensitivity control means is adapted to vary the lowest level of brightness of images sensed successively by said image sensor.

13. Device according to claim 1, wherein the image store is incorporated into the image sensor and comprises non-photosensitive areas adjacent photosensitive areas of the image sensor and each non-photosensitive area is adapted to retain a sum of part of electrical charges generated during a first period of opto-electrical operation and another part of electrical charges generated during a second period of opto-electrical operation.

14. Device according to claim 13, wherein the image sensor is a CCD sensor controlled by grids and said device further comprises a grid potential sequencer for varying the potential of said grids for each of the photosensitive elements of the electronic image sensor so that different sensitivities are used for two successive views and the electrical charges generated during the first of the views are partially retained in the non-photosensitive area and partially eliminated and said electrical charges retained in the first of the views are added to electrical charges generated during the second of the views.

15. Device according to claim 1, wherein the image store simultaneously stores the signal emitted from the image sensor and sends a signal previously stored, said image store retaining the image data of the image signal for a time period equal to that required by the image sensor to send complete image data, the image data simultaneously output by the image sensor and the image store relating to the same photosensitive element of the image sensor.

16. Device according to claim 15, wherein the input of the image store is electrically connected to an output of the image processing circuit so that the signal output stored by the image store is the signal processed by the image processing circuit.

17. Device according to claim 16, further comprising switch means having alternate settings for each view from the electronic image sensor and two inputs electrically connected respectively to the output of the image store and to the output of the image processing circuit and also having an output electrically connected to an output connector supplying an output signal for alternate images which is the output signal from the image store and an output signal for intervening images which is the output signal from the image processing circuit.

18. Device according to claim 16, wherein the image processing circuit includes means for reading the image store at a frequency lower than the operating frequency of the image sensor.

19. Device for increasing the dynamic range of an electronic image sensor comprising photosensitive elements for supplying successive signals representing images formed successively at the photosensitive elements, and sensitivity control means for varying the sensitivity of the electronic image sensor for each image, wherein the improvement comprises an image store having an input electrically connected to said image sensor, said image store being adapted to store the image data received from said image sensor and send a signal previously stored, image data simultaneously output by said image sensor and said image store corresponding to a same one of said photosensitive elements, and electronic image processing circuit means for combining image signals received directly from said image sensor and image signals received via said image store for supplying at an output connector an image signal having a greater dynamic range than the image sensor, and an electronic shutter coupled to said image sensor, the sensitivity control means controlling said electronic shutter by alternating viewing time for successive views between a short viewing time and a long viewing time.

20. Device for increasing the dynamic range of an electronic image sensor comprising photosensitive elements for supplying successive signals representing images formed successively at the photosensitive elements, and sensitivity control means for varying the sensitivity of the electronic image sensor for each image, wherein the improvement comprises an image store having an input electrically connected to said image sensor, said image store being adapted to store the image data received from said image sensor and send a signal previously stored, image data simultaneously output by said image sensor and said image store corresponding to a same one of said photosensitive elements, and electronic image processing circuit means for combining image signals received directly from said image sensor and image signals received via said image store for supplying at an output connector an image signal having a greater dynamic range than said image sensor, the image processing circuit means comprising a conversion circuit serially connected to an adder, the conversion circuit having an input electrically connected to the output of said image store and an output connected to the image store via the adder, said conversion circuit implementing an increasing and then decreasing transfer function.

21. Device for increasing the dynamic range of an electronic image sensor comprising photosensitive elements and supplying successive image data representing images formed successively at the photosensitive elements, wherein the improvement comprises an image store having an input electrically connected to the image sensor, said image store being adapted to store image data from the image sensor and send previously stored image data, the image data simultaneously output by the image sensor and by the image store relating to a same one of the photosensitive elements, a conversion circuit serially connected to an adder and together defining image data processing means, the image data processing means having an input electrically connected to the output of the image store and an output electrically connected to the input of the image store, the adder also being electrically connected to the image sensor for adding image data from the image sensor and the image store, and the conversion circuit implementing an increasing and then decreasing transfer function.

\* \* \* \* \*